United States Patent
Ho et al.

(10) Patent No.: US 9,536,321 B2
(45) Date of Patent: Jan. 3, 2017

(54) APPARATUS AND METHOD FOR FOREGROUND OBJECT SEGMENTATION

(71) Applicant: INTEL CORPORATION, Santa Clara, CA (US)

(72) Inventors: Hon Pong Ho, Santa Clara, CA (US); Haowei Liu, Santa Clara, CA (US); Mehul Sutariya, Sunnyvale, CA (US); Dave Tong, San Ramon, CA (US)

(73) Assignee: INTEL CORPORATION, Santa Clara, CA (US)

( * ) Notice: Subject to any disclaimer, the term of this patent is extended or adjusted under 35 U.S.C. 154(b) by 148 days.

(21) Appl. No.: 14/222,342

(22) Filed: Mar. 21, 2014

(65) Prior Publication Data

US 2015/0269739 A1 Sep. 24, 2015

(51) Int. Cl.
*G06T 7/00* (2006.01)
*G06T 7/40* (2006.01)
*G06T 7/20* (2006.01)

(52) U.S. Cl.
CPC ............ *G06T 7/408* (2013.01); *G06T 7/0075* (2013.01); *G06T 7/2006* (2013.01); *G06T 7/2053* (2013.01); *G06T 7/2086* (2013.01); *G06T 2207/10012* (2013.01); *G06T 2207/10021* (2013.01); *G06T 2207/10024* (2013.01); *G06T 2207/10028* (2013.01); *G06T 2207/20036* (2013.01); *G06T 2207/20076* (2013.01); *G06T 2207/20081* (2013.01); *G06T 2207/20144* (2013.01)

(58) Field of Classification Search
CPC ............... G06T 7/0081; G06T 7/408; G06T 2207/10024; G06T 7/0087; G06T 7/0093; G06T 2207/10028; G06T 2207/20144; G06K 9/4652; G06K 9/342
See application file for complete search history.

(56) References Cited

U.S. PATENT DOCUMENTS

| | | | |
|---|---|---|---|
| 2007/0122039 A1* | 5/2007 | Zhang | G06K 9/38 382/199 |
| 2011/0075921 A1* | 3/2011 | Sun | G06T 7/0081 382/164 |

\* cited by examiner

*Primary Examiner* — Duy M Dang
(74) *Attorney, Agent, or Firm* — Schwabe, Williamson & Wyatt, P.C.

(57) ABSTRACT

Embodiments of apparatus and methods for foreground object segmentation are described. In embodiments, an apparatus may include a color modeler to build a color model based at least in part on a boundary of a foreground object in an image frame. The apparatus may further include a segmentation processor to segment the foreground object from a background of the image frame, based at least in part on the color model. Other embodiments may be described and/or claimed.

22 Claims, 5 Drawing Sheets

APPARATUS AND METHOD FOR FOREGROUND OBJECT SEGMENTATION

FIELD OF THE INVENTION

The present disclosure relates generally to the technical field of image processing, and more particularly but not exclusively, to apparatuses and methods for segmenting a foreground object from its background.

BACKGROUND

The background description provided herein is for generally presenting the context of the disclosure. Unless otherwise indicated herein, the materials described in this section are not prior art to the claims in this application and are not admitted to be prior art or suggestions of the prior art, by inclusion in this section.

Regions of interest in an image are usually objects, such as humans, animals, artifacts, text, etc. in its foreground. Segmentation of a foreground object from its background has many applications. As one example, the segmented foreground object may be used for further processing, such as object recognition or background subtraction.

Background subtraction has an interesting application in video conferencing. The speaker may be segmented from its original background and seamlessly placed into another scene. Monocular based approach for foreground object segmentation has long been studied by the computer vision community. Yet it remains unsatisfactory because at least this approach usually requires the user to step out of the scene to build a background model.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
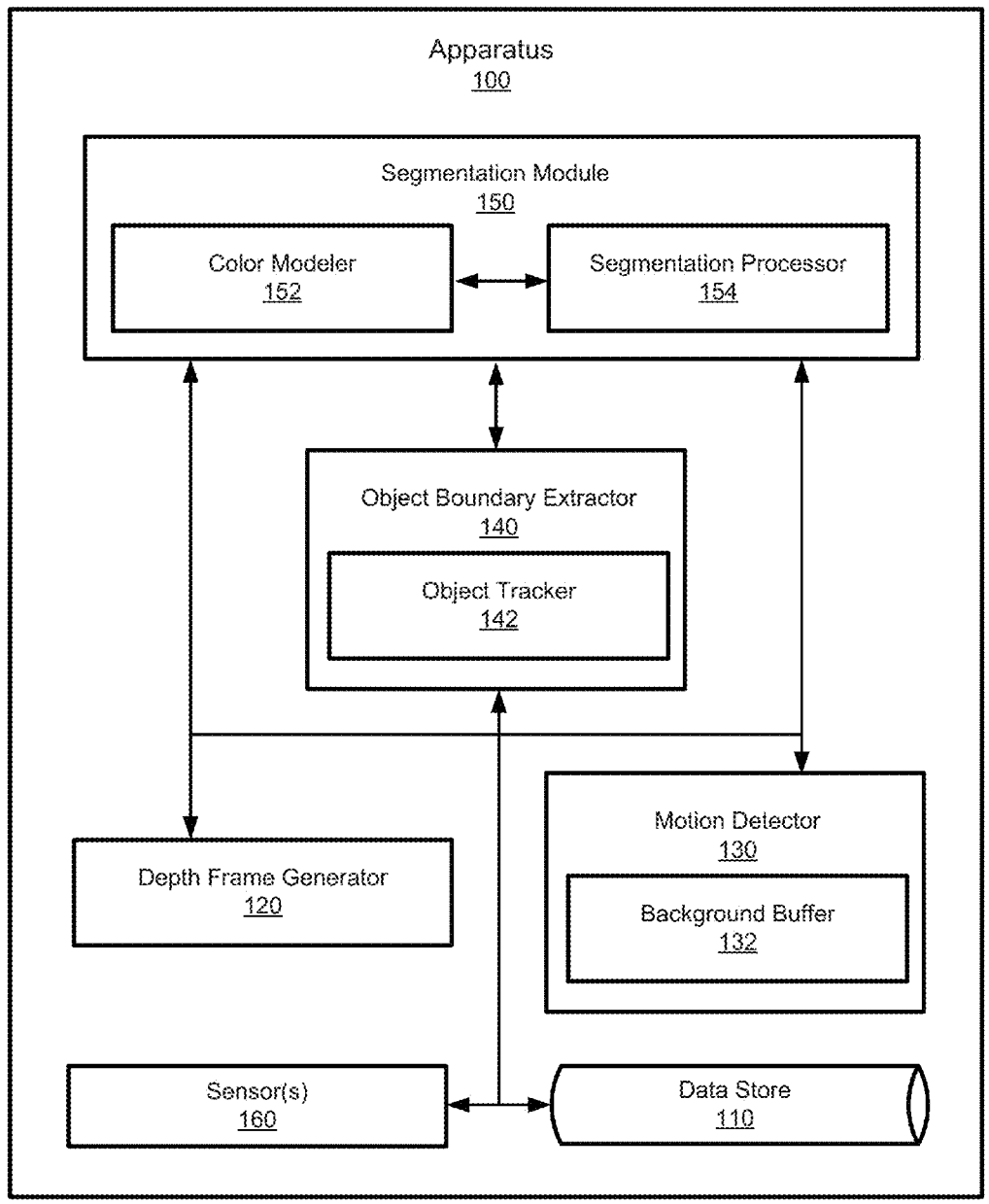
FIG. 1 is a schematic diagram illustrating an example implementation of an apparatus for foreground object segmentation, incorporating aspects of the present disclosure, in accordance with various embodiments.

Embodiments of apparatuses and methods for foreground object segmentation are described herein. In embodiments, an apparatus may include a color modeler to build a color model based at least in part on a boundary of a foreground object in an image frame. The apparatus may further include a segmentation processor to segment the foreground object from a background of the image frame, based at least in part on the color model. Other embodiments may be described and/or claimed. These and other aspects of the present disclosure will be more fully described below.

In the following detailed description, reference is made to the accompanying drawings, which form a part hereof, wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

Reference in the description to one embodiment or an embodiment means that a particular feature, structure or characteristic described in connection with the embodiment is included in at least one embodiment of the invention. The description may use the phrases "in one embodiment," "in an embodiment," "in another embodiment," "in embodiments," "in various embodiments," or the like, which may each refer to one or more of the same or different embodiments. Furthermore, the terms "comprising," "including," "having," and the like, as used with respect to embodiments of the present disclosure, are synonymous.

In embodiments, the term "module" may refer to, be part of, or include an application specific integrated circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. In embodiments, a module may be implemented in firmware, hardware, software, or any combination of firmware, hardware, and software. In embodiments, the term "interface" may refer to a point of interaction with software or computer hardware, including peripheral devices such as a computer monitor, a networking device, a camera, a video recorder, etc.

Referring now to FIG. 1, an example implementation of an apparatus for foreground object segmentation, in accordance with various embodiments, is illustrated. In embodiments, apparatus 100 may be a mobile device including or coupled with one or more recording devices. In embodiments, apparatus 100 may be a distributed system with various components or subsystems distributed at various wearable, mobile, or stationary devices. In embodiments, apparatus 100 may be a mobile device equipped with various sensors that may capture images as well as their associated depth information. Furthermore, apparatus 100 may utilize the captured depth information for segmenting a foreground object of an image frame from its background.

In embodiments, apparatus 100 may include depth frame generator 120 to receive an image frame with depth information from data store 110 or sensor(s) 160. Depth frame generator 120 may be able to generate a full depth frame from the image frame. Depth frame generator 120 may be coupled with motion detector 130, which may produce a motion mask indicating moving pixels in the image frame. Motion detector 130 may be coupled with object boundary extractor 140, which may identify the boundary of a foreground object based at least in part on the depth frame and the motion mask associated with the current image frame. Apparatus 100 may further include segmentation module 150, coupled to object boundary extractor 140, to segment the foreground object from its background based in part on a color model associated with the foreground object.

In embodiments, sensor(s) 160 may generate imaging data with depth information. In some embodiments, sensor(s) 160 may include a depth sensor capable of depth-sensing and providing depth data aligned with color data, e.g., RGB color data. In some embodiments, sensor(s) 160 may include a stereo camera, which may provide time-synchronized images through either hardware or software. For example, a stereo camera may provide time-synchronized color images at 30 frames per second (fps) for both left and right channels. In other embodiments, sensor(s) 160 may include other type of sensors capable of gathering depth information.

In some embodiments, depth information associated with imaging data may be stored in data store 110. In some embodiments, depth information associated with imaging data may be directly provided to other components in apparatus 100 without being first stored in data store 110. In embodiments, data store 110 may store other types of information, such as known object shapes associated with the imaging data.

In embodiments, depth frame generator 120 may receive a stereo image frame set including a left frame and a right frame from data store 110 or sensor(s) 160. Depth frame generator 120 may rectify the left and right frames to generate a rectified stereo image frame. In embodiments, the stereo image frame set may be translated and transformed such that epipolar lines may collinear and parallel to the horizontal axis based on the intrinsic parameters of cameras taking the stereo image, the extrinsic parameters of the imaging system, the rotation matrix, etc. In general, searching along horizontal epipolar lines may be algorithmically more efficient than searching along general epipolar lines. In other embodiments, image rectification may be processed by other components (not shown) internal or external to apparatus 100 so that depth frame generator 120 may directly retrieve rectified image frames, e.g., from data store 110.

Given a pair of rectified image frames, depth frame generator 120 may generate a full depth frame, e.g., by applying a stereo matching algorithm, such as the Semi-Global Block Matching (SGBM) algorithm to the rectified images. Depth frame generator 120 may apply the stereo matching algorithm to multiple imaging frames to generate multiple depth frames, e.g., in a sequence.

In some embodiments, depth frame generator 120 may receive data streams from depth and imaging sensors separately, which may have different resolutions and offset. Therefore, depth frame generator 120 may perform a computational procedure to map the depth information to the color information on an image frame, e.g., mapping depth pixels to the color image based on pixel alignment for depth and color. Consequently, a depth frame may be generated. In some embodiments, depth frame generator 120 may receive a RGB-depth image frame from data store 110 or sensor(s) 160. The depth and color frames may be misaligned, e.g., due to parallax distortion. Depth frame generator 120 may then conduct a RGB-depth aligning process on the RGB-depth image frame to generate a depth frame. In embodiments, only pixels in a region potentially associated with a foreground object are mapped to further improve the aligning process.

In embodiments, motion detector 130 may include background buffer 132. Background buffer 132 may store information indicating the background of the foreground object established at a prior image frame processing session. In embodiments, motion detector 130 may determine pixels associated with motion in an image frame and accordingly output a motion mask indicating such pixels. The motion mask may provide indications of foreground objects.

Many suitable motion detection methods may be used, e.g., by examining the pixel difference between the current and one or more previous image frames. In embodiments, motion detector 130 may use a motion detection method based on an accumulative frame differencing algorithm and the information indicating the background of the foreground object established in a prior image frame processing session. After performing the accumulative frame differencing algorithm, pixels that are similar to the background along the contour band of the foreground objects may be removed.

Rectified stereo images may have left frames and right frames. In some embodiments, motion detector 130 may use only left frames or only right frames to generate the motion mask, e.g., for two-dimensional video conferencing applications. In embodiments, multiple motion detectors based on frame differencing may be used in parallel to improve efficiency.

In embodiments, object boundary extractor 140 may be coupled to color modeler 152 and/or segmentation processor 154. Object boundary extractor 140 may identify the boundary of a foreground object in an image frame based at least in part on a depth frame and a motion mask associated with the image frame. Object boundary extractor 140 may provide information of the boundary of the foreground object to color modeler 152.

In embodiments, object boundary extractor 140 may contain object tracker 142, which may provide location information for a foreground object. In embodiments, object boundary extractor 140 may overlay the motion mask on the depth frame to generate a component map. Then, object boundary extractor 140 may perform connected component analysis on the component map to produce a set of candidate blobs. Object boundary extractor 140 may select a working foreground object blob, which may contain the foreground object, from the set of candidate blobs, based at least in part on the location information provided by object tracker 142.

In embodiments, the selection criteria for the working blob may be application-dependent. As an example, the working blob may be selected based on the size, depth, and the presence of the face of a person. In embodiments, object tracker 142 may track an interested foreground object based on its previous locations or unique characteristics. As an example, object tracker 142 may track the location of a face, e.g., by tracking previous locations of the face in the previous image frames logically placed before the current image frame, e.g., based on a time sequence.

In embodiments, segmentation module 150 may include color modeler 152 and segmentation processor 154. Color modeler 152 may build a color model based at least in part on a boundary of a foreground object in an image frame. In embodiments, color modeler 152 may detect the foreground color associated with the foreground object and construct an adaptive color model based at least in part on the detected foreground color. In embodiments, color modeler 152 may employ an initial color model to determine foreground pixels of the foreground object, thus the foreground color. In embodiments, color modeler 152 may impose a bounding region based on the boundary of a foreground object, e.g., provided by object boundary extractor 140. Color modeler 152 may detect one or more foreground colors inside the boundary of the foreground object and one or more background colors outside the boundary of the foreground object but inside the bounding region. The detected foreground and background colors may then be used to refine the color model associated with the foreground object.

In embodiments, segmentation processor 154 may generate a foreground probability map based on the color model associated with the foreground object. The foreground probability map may indicate the probability of a pixel of the image frame being a foreground pixel associated with the foreground object in the image frame. Accordingly, segmentation processor 154 may refine the working blob to segment the foreground object within the working blob based on the foreground probability map.

In embodiments, segmentation processor 154 may segment the foreground object from its background based further on a known foreground object shape. In some embodiments, the shape may be preserved from previous frame processing sessions. In some embodiments, the shape may be retrieved from data store 110. In some embodiments, the shape may be a default shape predetermined based on the object type. As an example, an oval shape may be prepared as the default shape for a head.

In embodiments, apparatus 100 may be implemented differently as depicted in FIG. 1. As an example, motion detector 130 may be omitted so that object boundary extractor 140 may produce a component map directly from depth frames. As another example, motion detector 130 may be implemented as an integrated sub-component of depth frame generator 120 to produce a component map from image data. Yet as another example, color modeler 152 may be implemented into multiple separate components, such as a color-based refinement module to refine the color model and a foreground color detection module to detect the foreground color. Yet as another example, sensor(s) 160 and data store 110 may be implemented external to apparatus 100.

In embodiments, components depicted in FIG. 1 may have direct or indirect connection not shown in FIG. 1. As an example, segmentation module 150 may be directly connected with data store 110, depth frame generator 120, and/or motion detector 130 to gather necessary information for foreground object segmentation.

In embodiments, some or all components of apparatus 100 may be implemented in hardware or software, or combination thereof, as well as spread across any number of different devices or networks. In embodiments, data store 110 may be remote to apparatus 110. In embodiments, depth frame generator 120 may be, directly or indirectly, in communication with various sensors or recording devices to obtain imaging data with depth information without contacting data store 110. In embodiments, apparatus 100 may be in communication with various recording/sensing devices via one or more communication modules (not shown in FIG. 1) with any suitable communication protocols to receive imaging data with depth information.

In embodiments, apparatus 100 may be configured for foreground object segmentation or background removal on imaging data with depth information. Apparatus 100 may use an efficient motion detector with background buffering to obtain a working blob from a component map. Apparatus 100 may use an online adaptive foreground color model to counter lighting variations and build an accurate color model. Resultantly, by properly fusing multiple cues, such as color, motion, and depth, a robust foreground segmentation solution may be attained with reasonable hardware and computational cost.

Figure 2:
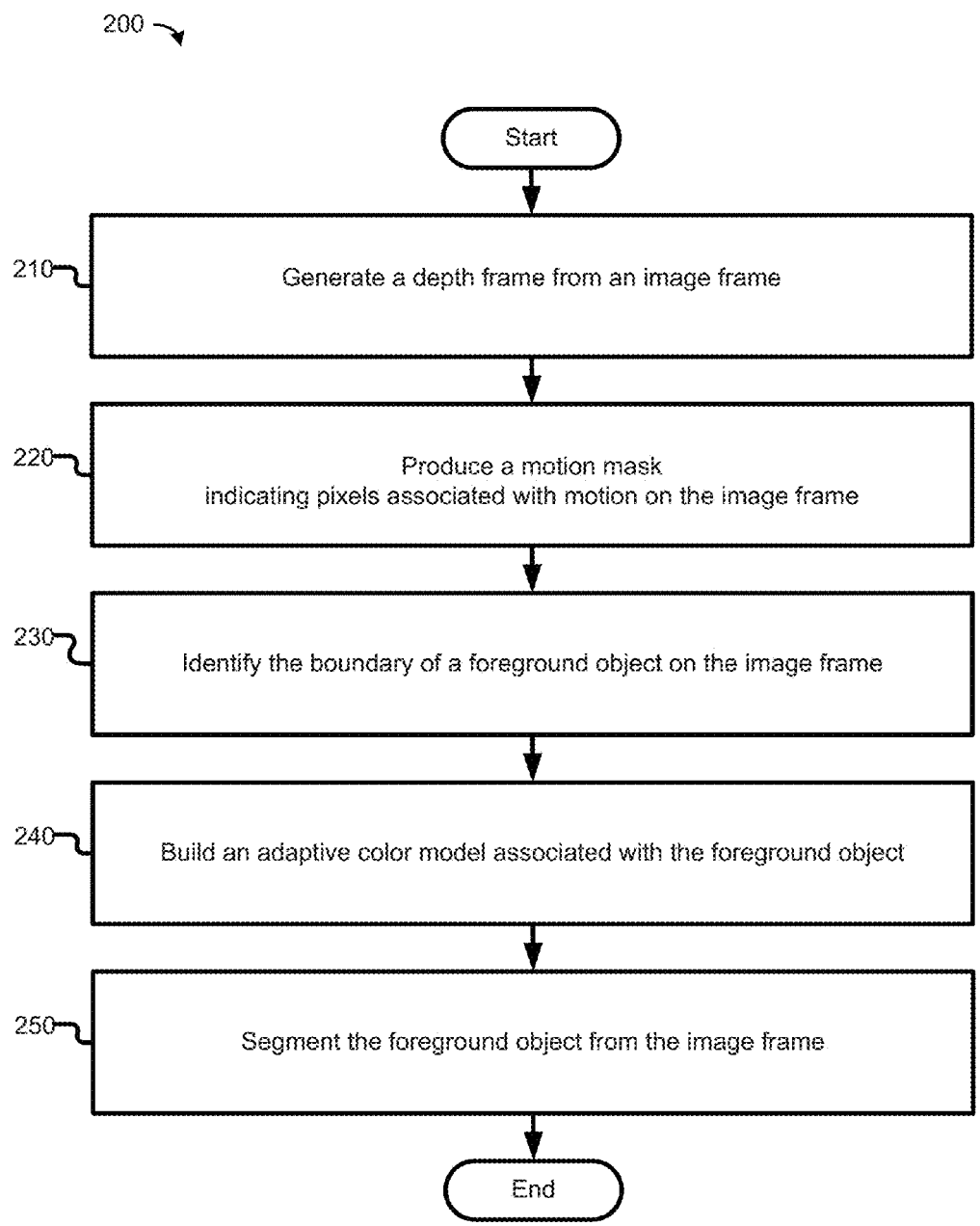
FIG. 2 is a flow diagram of an example process for foreground object segmentation, which may be practiced by an example apparatus, incorporating aspects of the present disclosure, in accordance with various embodiments.

Referring now to FIG. 2, a flow diagram of an example process 200 for foreground object segmentation is illustrated. Process 200 may be performed by processing logic that comprises hardware (e.g., circuitry, dedicated logic, programmable logic, microcode, etc.), software (e.g., instructions run on a processing device to perform hardware simulation), or a combination thereof. The processing logic may be configured for foreground object segmentation. As such, process 200 may be performed by a computing device, e.g., apparatus 100 in connection with FIG. 1, to implement one or more embodiments of the present disclosure. In embodiments, various blocks in FIG. 2 may be combined or arranged in any suitable order, e.g., according to the particular embodiment of apparatus 100 to conduct foreground object segmentation.

In embodiments, the process may begin at block 210, where a depth frame may be generated from an image frame, e.g., by depth frame generator 120. As discussed in connection with FIG. 1, in embodiments, the image frame may be a RGB-depth image frame. Moreover, the image frame may be part of a stereo image frame set that can be rectified to expedite subsequent computation.

In embodiments, a full depth frame may be generated by conducting a RGB-depth aligning process on a RGB-depth image frame. In embodiments, a full depth frame may be generated by applying a stereo matching algorithm, such as the SGBM algorithm, to a pair of rectified images. The time complexity of depth aligning or stereo matching may be high. In embodiments, multiple threads may be pipelined to generate the depth frames efficiently and to keep up the real time frame rate. As an example, multiple threads may be used to generate the alternating depth frames into a queue so that subsequent stages of processing may be expedited. The number of threads may be an adjustable parameter, and can be used to control the balance between the CPU load and the application-dependent frame rate.

In embodiments, to lower the computational overhead, image data may be down-sampled before applying the stereo matching algorithm, e.g., down-sampled to only a quarter of the original resolution. Down-sampled stereo image data may be used to generate multiple depth frames in a queue. The depth resolution in this case may become lower; however, process 200 may still be carried out with such lower depth resolution, enhanced by this disclosure. Without requiring high quality and resolution of depth data, low-end stereo cameras may be used, and more importantly, the system performance of process 200 may be improved.

Next, at block 220, a motion mask indicating pixels associated with motion on the image frame may be produced, e.g., by motion detector 130. As discussed in connection with FIG. 1, in embodiments, a motion detection method based on accumulative frame differencing and a background buffer may be used to generate the motion mask. Given a frame $F_t$, and previous frames $F_{t-1}, F_{t-2} \ldots F_{t-N}$ where N controls the degree of temporal accumulation, as an example, a moving pixel may be detected if the sum of the absolute value of its accumulative temporal difference in the RGB channel is greater than a threshold.

In embodiments, after grouping the moving pixels, hole filling and rejecting outlying clusters, motion detector 130 may produce the motion mask, such as using 1 indicating moving pixels and 0 otherwise. The 1-mask may be further refined based on the background information stored in a background buffer (e.g., in RGB format) which may be established in a prior frame processing process. Pixels that are similar to the background along the contour band of the foreground objects may be removed. The 0-mask may be used to create and update the aforementioned background for next frame processing. To update the background buffer, a pixel copying operation from $F_t$ to the 0-masked regions may be used.

In embodiments, generating the motion mask may become a bootstrapping procedure to the subsequent operations. Process 200 may avoid the complexity of background modeling if a coarse motion mask becomes sufficient for subsequent foreground object segmentation when enhanced with this disclosure. Resultantly, sufficient budget may be reserved for subsequent computation in keeping up with the desired frame rate.

Next, at block 230, the boundary of a foreground object on the image frame may be identified, e.g., by object boundary extractor 140. In embodiments, a component map may be produced by overlaying the motion mask on the depth frame. A set of candidate blobs may then be produced from the component map, e.g., after performing a connected component analysis. Further, a working blob, which may contain a coarse contour of the foreground object, may be selected from the set of candidate blobs, e.g. based on location information of the foreground object.

The location of the foreground object may be tracked from a previous frame processing session, e.g., by object tracker 142. Given the location of the tracked foreground object, it may be determined whether any candidate blob in the current frame may contain the tracked foreground object. The one or more blobs with the tracked foreground object may be selected as the working blob(s) for subsequent operations.

In embodiments, in conjunction with or in addition to the tracking process, a depth threshold from the previous frame may be used to select the working blob that is within the threshold and/or meets size constraint as the foreground object. In embodiments, if the outcome from the tracking process is incoherent with the depth-based working blob selection caused, e.g. by the change of object orientation or occlusion (e.g., a hand in front of the face), the depth-based selection may be given precedence. In embodiments, a default threshold may be used, e.g., what is calibrated at a normal user position for video conferencing.

Next, at block 240, an adaptive color model associated with the foreground object may be built, e.g., by color modeler 152. In embodiments, an adaptive statistical foreground/background color model may be established based on the determined foreground pixels and their color. The determination of the foreground color is further illustrated in connection with FIG. 3. In embodiments, the adaptive color model may be built based at least in part on a boundary of the foreground object. In embodiments, a bounding region may be imposed based on the boundary of the foreground object. As an example, the pixels inside the boundary of the foreground object may be treated as foreground, and the pixels in the rest of the bounding region may be treated as background. Hence, one or more foreground colors inside the boundary of the foreground object and one or more background colors outside the boundary of the foreground object but inside the bounding region may be detected. The detected foreground and background colors may then be used to refine the color model associated with the foreground object.

Next, at block 250, the foreground object may be segmented from the image frame, e.g., by segmentation processor 154. In embodiments, a foreground probability map may be generated based on the color model associated with the foreground object. Since the foreground probability map indicates the probability of a pixel of the image frame being a foreground pixel associated with the foreground object, the foreground pixels may then be determined by applying the foreground probability map to the image frame. Accordingly, the foreground pixels may be segmented from the image to form the segmented foreground object.

In embodiments, various smoothing techniques may be applied to produce refined foreground objects. As an example, $\alpha$-blending may be applied to smooth the foreground/background boundary. In embodiments, a known foreground object shape may further be used for the segmentation process. In some embodiments, the shape may be preserved from previous frame processing sessions. In some embodiments, the shape may be retrieved from a local or remote database. In some embodiments, the shape may be a default shape predetermined based on the object type.

Figure 3:
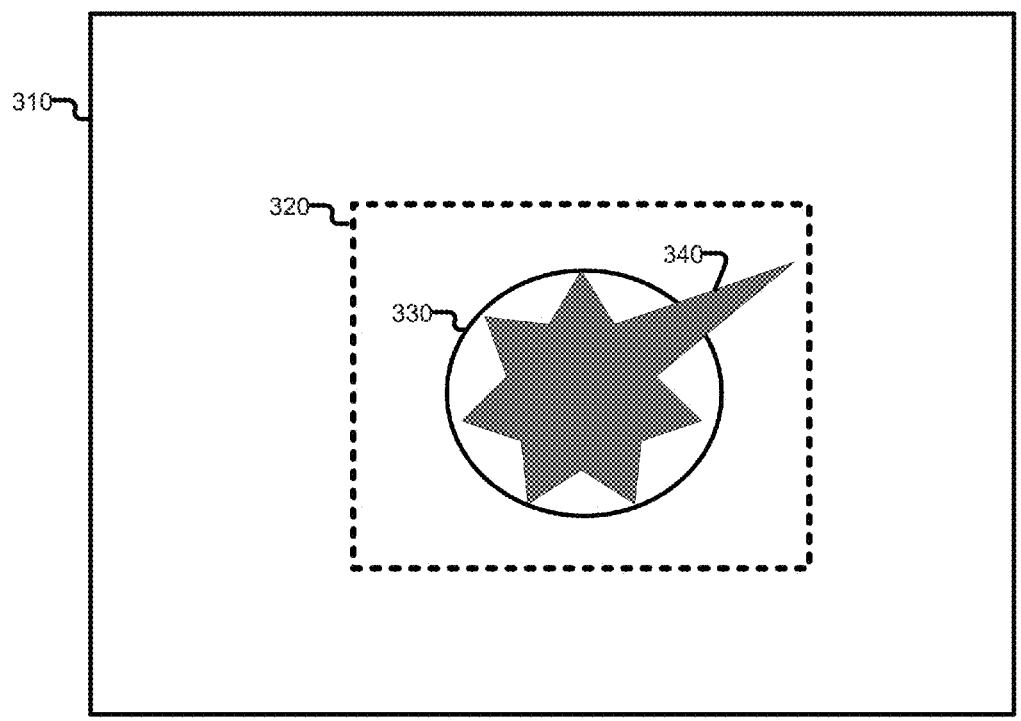
FIG. 3 is a schematic diagram illustrating foreground color detection, which may be practiced by an example apparatus, incorporating aspects of the present disclosure, in accordance with various embodiments.

Referring now to FIG. 3, it is a schematic diagram illustrating foreground color detection, which may be practiced by an example apparatus in accordance with various embodiments. In embodiments, foreground color detection may be performed in reference to block 240 and/or 250 in FIG. 2.

In embodiments, given component map 310, bounding region 320 may be imposed around working blob 330, e.g., by color modeler 152 in connection with FIG. 1. The pixels within working blob 330 may be treated as foreground, and the rest pixels in bounding region 320, outside of working blob 330, may be treated as background. Accordingly, a color model may be built based on the determined foreground and background. In embodiments, bounding region 320 and/or working blob 330 may be in arbitrary shape digitized by binary masks. In embodiments, bounding region 320 may converge to a shape close to foreground object 340 in another iteration of foreground color detection.

In embodiments, the color model may be trained based on color histograms. As an example, denoting the local histogram foreground and background models as $F_L$, and $B_L$, and existing models as $F_0$, $B_0$, the new foreground and background models $F_1$ and $B_1$ may be updated according to the equation 1, where $\alpha$ is the learning rate.

$$F_1 = F_0 + \alpha * F_L, B_1 = B_0 + \alpha * B_L \qquad \text{(Equation 1)}$$

In embodiments, the color model may be applied to each pixel inside bounding region 320 to generate a per-pixel foreground probability map for component 330. As an example, let P(p|M) be the probability of a pixel p belonging to the model M, the probability of the pixel p being a foreground pixel, P(p), may be computed in a Bayesian manner according to the equation 2

$$P(p) = \frac{P(p|F_1)}{P(p|B_1) + P(p|F_1)} \quad \text{(Equation 2)}$$

In embodiments, as discussed in connection with FIG. 2, there may be feedback loops between detecting the foreground color and building the color model, as well as between detecting the foreground color and segmenting the foreground object.

The segmented foreground object may provide useful information to further refine the foreground color, subsequently to refine the color model. As an example, bounding region 320 may be redefined to closely fit around the edges of the segmented foreground object 340 after its initial segmentation. Therefore, a new round of foreground color detection may be conducted. For example, the pixels within the segmented foreground object 340 may be treated as foreground, and the rest pixels in the new bounding region may be treated as background. Accordingly, a refined color model may be built based on the new foreground and background.

Advantageously, the next refined color model, based on the aforementioned feedback loops and the local histogram foreground and background models, may now be built based on more accurate positive color samples for the foreground object and more accurate negative color samples for the background near the edges of the foreground object. Resultantly, the foreground object may be segmented in the next iteration with sharper edges based on the refined color model.

In embodiment, this feedback loop may also be used to improve the foreground color detection and update the color model to counter different lighting effects, such as changes of camera exposure parameters. Resultantly, segmentation noise, such as filled gaps and augmented regions from the background, may be removed.

Figure 4:
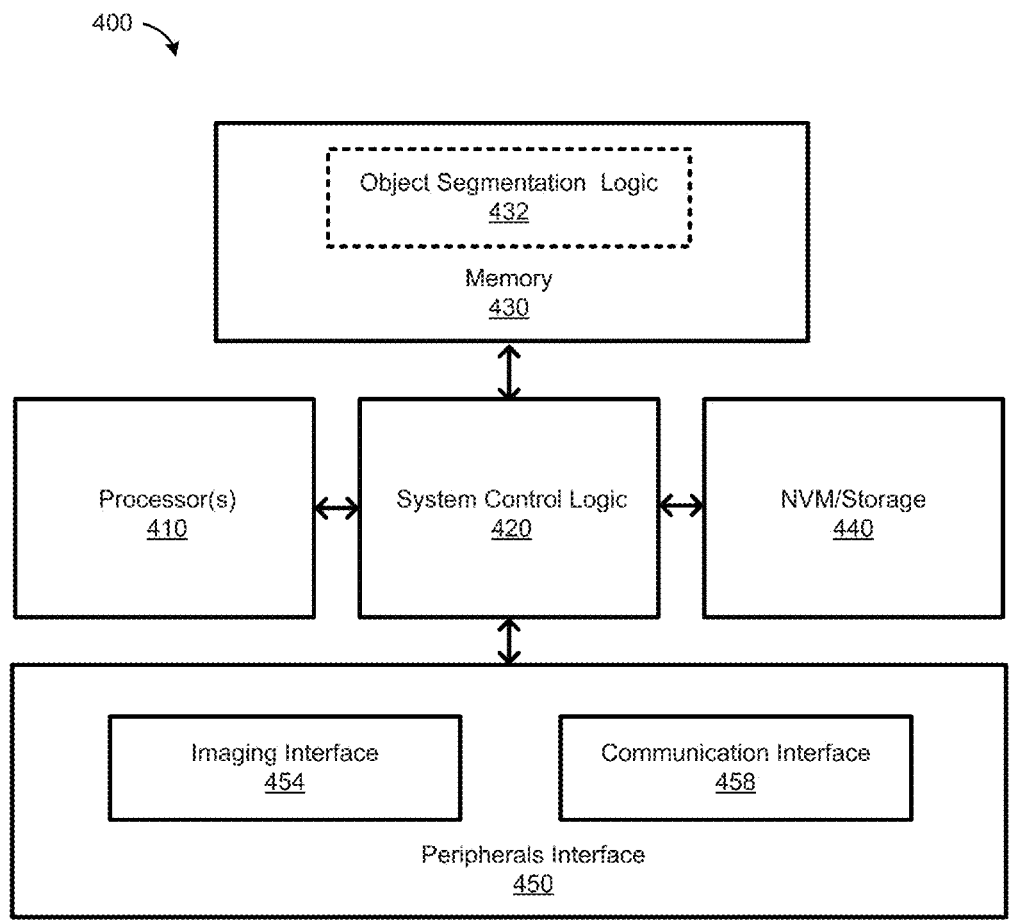
FIG. 4 illustrates an example computing device suitable for practicing the disclosed embodiments, in accordance with various embodiments.

FIG. 4 illustrates an embodiment of a computing device 400 suitable for practicing embodiments of the present disclosure. As illustrated, computing device 400 may include system control logic 420 coupled to one or more processor(s) 410, to system memory 430, to non-volatile memory (NVM)/storage 440, and to one or more peripherals interface 450. In various embodiments, the one or more processors 410 may include a processor core.

In embodiments, peripherals interface 450 may include imaging interface 454, which may be used as an interface for computing device 400 to communicate with a variety of recording devices or sensors, e.g., sensor(s) 160 in connection with FIG. 1. Thus, imaging interface 454 may include or be coupled to a broad range of wired or wireless interfaces, including but are not limited, I²C bus, universal serial bus (USB), Bluetooth®, wireless network interface controller (WNIC), and the like. Imaging interface 454 may be configured to communicate with an array of sensors, distributed in multiple recording devices, including, but not limited to, cameras for recording still images or video, video recorders for recording sound and/or video, etc.

Communication interface 458 within peripherals interface 450 may provide an interface for computing device 400 to communicate over one or more network(s) and/or with any other suitable device. Communication interface 458 may include any suitable hardware and/or firmware, such as a network adapter, one or more antennas, wireless interface(s), and so forth. In various embodiments, communication interface 458 may include an interface for computing device 400 to use near field communication (NFC), optical communications, or other similar technologies to communicate directly (e.g., without an intermediary) with another device. In various embodiments, communication interface 458 may interoperate with radio communications technologies such as, for example, Wideband Code Division Multiple Access (WCDMA), Global System for Mobile communications (GSM), Long Term Evolution (LTE), WiFi, Bluetooth®, Zigbee, and the like.

In some embodiments, system control logic 420 may include any suitable interface controllers to provide for any suitable interface to the processor(s) 410 and/or to any suitable device or component in communication with system control logic 420. System control logic 420 may also interoperate with a display (not shown) for display of information, such as to a user. In various embodiments, the display may include one of various display formats and forms, such as, for example, liquid-crystal displays, cathode-ray tube displays, e-ink displays, projection displays. In various embodiments, the display may include a touch screen.

In some embodiments, system control logic 420 may include one or more memory controller(s) (not shown) to provide an interface to system memory 430. System memory 430 may be used to load and store data and/or instructions, for example, for computing device 400. System memory 430 may include any suitable volatile memory, such as suitable dynamic random access memory (DRAM), for example.

In some embodiments, system control logic 420 may include one or more input/output (I/O) controller(s) (not shown) to provide an interface to NVM/storage 440 and peripherals interface 450. NVM/storage 440 may be used to store data and/or instructions, for example. NVM/storage 440 may include any suitable non-volatile memory, such as flash memory, for example, and/or may include any suitable non-volatile storage device(s), such as one or more hard disk drive(s) (HDD), one or more solid-state drive(s), one or more compact disc (CD) drive(s), and/or one or more digital versatile disc (DVD) drive(s), for example. NVM/storage 440 may include a storage resource that is physically part of a device on which computing device 400 is installed or it may be accessible by, but not necessarily a part of, computing device 400. For example, NVM/storage 440 may be accessed by computing device 400 over a network via communication interface 458. In embodiments, NVM/storage 440 may be serving as data store 110 in FIG. 1.

In embodiments, system memory 430, NVM/storage 440, and system control logic 420 may include, in particular, temporal and persistent copies of object segmentation logic 432. Object segmentation logic 432 may include instructions that, when executed by at least one of the processor(s) 410, result in computing device 400 to perform foreground object segmentation, such as, but not limited to, processes 200.

In some embodiments, at least one of the processor(s) 410 may be packaged together with memory having system control logic 420 and/or object segmentation logic 432. In some embodiments, at least one of the processor(s) 410 may be packaged together with memory having system control logic 420 and/or object segmentation logic 432 to form a System in Package (SiP). In some embodiments, at least one of the processor(s) 410 may be integrated on the same die with memory having system control logic 420 and/or object segmentation logic 432. In some embodiments, at least one of the processor(s) 410 may be integrated on the same die with memory having system control logic 420 and/or object segmentation logic 432 to form a System on Chip (SoC).

Depending on which modules of apparatus 100 in connection with FIG. 1 are hosted by computing device 400, the capabilities and/or performance characteristics of processors 410, system memory 430, and so forth, may vary. In various implementations, computing device 400 may be a wearable computing device, a smartphone, a tablet, a mobile computing device, a server, etc., enhanced with the teachings of the present disclosure. In embodiments, the placement of the different modules in FIG. 4 and/or how they are coupled with other modules may be different from what is illustrated in FIG. 4.

Figure 5:
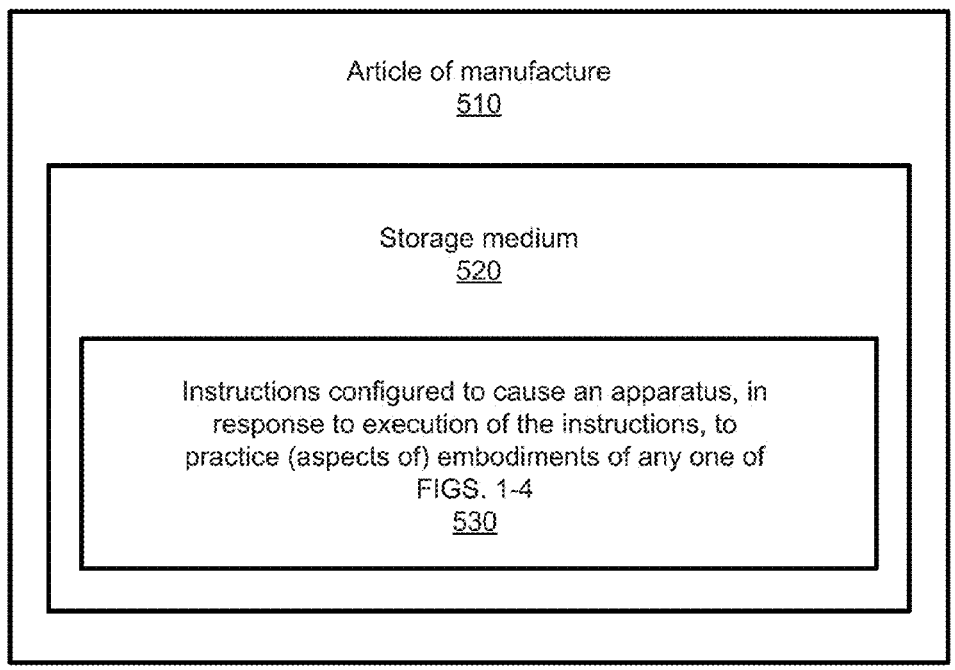
FIG. 5 illustrates an article of manufacture having programming instructions, incorporating aspects of the present disclosure, in accordance with various embodiments.

FIG. 5 illustrates an article of manufacture 510 having programming instructions, incorporating aspects of the present disclosure, in accordance with various embodiments. In various embodiments, an article of manufacture may be employed to implement various embodiments of the present disclosure. As shown, the article of manufacture 510 may include a computer-readable storage medium 520 where instructions 530 configured to practice embodiments of or aspects of embodiments of any one of the processes described herein. The storage medium 520 may represent a broad range of persistent storage media known in the art, including but not limited to flash memory, dynamic random access memory, static random access memory, an optical disk, a magnetic disk, etc. Instructions 530 may enable an apparatus, in response to their execution by the apparatus, to perform various operations described herein. For example, storage medium 520 may include instructions 530 configured to cause an apparatus, e.g., apparatus 100, to practice some or all aspects of foreground object segmentation in connection with FIGS. 1-4, in accordance with embodiments of the present disclosure. In embodiments, computer-readable storage medium 520 may include one or more computer-readable non-transitory storage medium. In other embodiments, computer-readable storage medium 520 may be transitory, such as signals, encoded with instructions 530.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

The following paragraphs describe examples of various embodiments.

Example 1 is an apparatus for foreground object segmentation, which may include a color modeler to build a color model based at least in part on a boundary of a foreground object in an image frame. Furthermore, the apparatus may include a segmentation processor, coupled to the color modeler, to segment the foreground object from a background of the image frame, based at least in part on the color model.

Example 2 may include the subject matter of Example 1, and may further include an object boundary extractor, coupled to the color modeler, to identify the boundary of the foreground object based at least in part on a depth frame and a motion mask associated with the image frame, wherein the depth frame has depth information of the image frame, and the motion mask has information indicating pixels associated with motion.

Example 3 may include the subject matter of Example 2, and may further specify that to identify the boundary of the foreground object, the object boundary extractor may produce a plurality of foreground object candidate blobs based at least in part on a connected component analysis performed on a component map based at least in part on the depth frame and the motion mask associated with the image frame.

Example 4 may include the subject matter of Example 3, and may further specify that the object boundary extractor may include an object tracker to provide location information for the foreground object, and the object boundary extractor is to select a working foreground object blob from the plurality of candidate blobs, based at least in part on the location information provided by the object tracker.

Example 5 may include the subject matter of Examples 2-4, and may further include a motion detector, coupled to the object boundary extractor, to produce the motion mask.

Example 6 may include the subject matter of Example 5, and may further specify that the motion detector is to produce the motion mask based at least in part on accumulative frame differencing.

Example 7 may include the subject matter of Example 5 or 6, and may further include a background buffer to store information indicating a background established for a prior image frame processed. The motion detector is to refine the motion mask based at least in part on the information indicating the background established for the prior image frame processed.

Example 8 may include the subject matter of Examples 2-7, and may further include a depth frame generator, coupled to the object boundary extractor, to generate the depth frame for the image frame.

Example 9 may include the subject matter of Example 8, and may further specify that the image frame may be part of a stereo image frame set including a left frame and a right frame, and the depth generator is to rectify the left and right frames to generate a rectified stereo image frame and apply a stereo matching algorithm on the rectified stereo image frame to generate the depth frame.

Example 10 may include the subject matter of Example 8, and may further specify that the image frame is a RGB-depth image frame and the depth frame generator is to conduct a RGB-depth aligning process on the RGB-depth image frame to generate the depth frame.

Example 11 may include the subject matter of Examples 1-9, and may further specify that the color modeler is to detect a plurality of foreground colors inside the boundary of the foreground object and a plurality of background colors outside the boundary of the foreground object but inside a bounding region based on the boundary of the foreground object.

Example 12 may include the subject matter of Example 11, and may further specify that the color modeler is to refine the color model with a feedback loop based on the plurality of foreground colors and the plurality of background colors.

Example 13 may include the subject matter of Examples 1-12, and may further specify that the color modeler is to generate a foreground probability map based on the color model.

Example 14 may include the subject matter of Example 11, and may further specify that the segmentation processor is to segment the foreground object based at least in part on the foreground probability map.

Example 15 may include the subject matter of Examples 1-14, and may further specify that the segmentation processor is to segment the foreground object based further on a known foreground object shape.

Example 16 may include the subject matter of Examples 1-14, and may further include a stereo camera or a RGB-depth image sensor to generate the image frame.

Example 17 is a method for foreground object segmentation, which may include building a color model, by a computing system, based at least in part on a boundary of a foreground object in an image frame; and segmenting, by the computing system, the foreground object from a background of the image frame, based at least in part on the color model.

Example 18 may include the subject matter of Example 17, and may further include identifying the boundary of the foreground object based at least in part on a depth frame and a motion mask associated with the image frame, wherein the depth frame has depth information of the image frame, and the motion mask has information indicating pixels associated with motion.

Example 19 may include the subject matter of Example 17 or 18, and may further include generating a component map based at least in part on the depth frame and the motion mask associated with the image frame; producing a plurality of foreground object candidate blobs based at least in part on a connected component analysis performed on the component map; selecting a working foreground object blob from the plurality of foreground object candidate blobs, based at least in part on location information for the foreground object; and identifying a boundary of the working foreground object blob.

Example 20 may include the subject matter of Examples 17-19, and may further include producing the motion mask based at least in part on accumulative frame differencing and a background buffer indicating a background established for a prior image frame processed.

Example 21 may include the subject matter of Examples 17-20, and may further specify that the image frame is part of a stereo image frame set including a left frame and a right frame. The method may further include rectifying the left and right frames to generate a rectified stereo image frame; and applying a stereo matching algorithm on the rectified stereo image frame to generate the depth frame.

Example 22 may include the subject matter of Examples 17-21, and may further specify that the image frame is a RGB-depth image frame. The method may further include conducting a RGB-depth aligning process on the RGB-depth image frame to generate the depth frame.

Example 23 may include the subject matter of Examples 17-22, and may further include detecting a plurality of foreground colors inside the boundary of the foreground object; detecting a plurality of background colors outside the boundary of the foreground object but inside a bounding region based on the boundary of the foreground object; and refining the color model based on a histogram foreground model and a histogram background model, wherein the foreground histogram model is based on the plurality of foreground colors, and the background histogram model is based on the plurality of background colors.

Example 24 may include the subject matter of Example 17-23, and may further include generating a foreground probability map based on the color model; and segmenting the foreground object based at least in part on the foreground probability map.

Example 25 may include the subject matter of Example 17-24, and may further include segmenting the foreground object based further on a known foreground object shape.

Example 26 is a computer-readable storage medium having stored therein instructions configured to cause a device, in response to execution of the instructions by the device, to practice the subject matter of any one of Examples 17-25. The storage medium may be non-transient.

Example 27 is an apparatus for foreground object segmentation, which may include means for building a color model, by a computing system, based at least in part on a boundary of a foreground object in an image frame; and means for segmenting, by the computing system, the foreground object from a background of the image frame, based at least in part on the color model.

Example 28 may include the subject matter of Example 27, and may further include means for identifying the boundary of the foreground object based at least in part on a depth frame and a motion mask associated with the image frame, wherein the depth frame has depth information of the image frame, and the motion mask has information indicating pixels associated with motion.

Example 29 may include the subject matter of Example 27 or 28, and may further include means for detecting a plurality of foreground colors inside the boundary of the foreground object; means for detecting a plurality of background colors outside the boundary of the foreground object but inside a bounding region based on the boundary of the foreground object; and means for refining the color model based on the plurality of foreground colors and the plurality of background colors.

Example 30 may include the subject matter of Examples 27-29, and may further include means for generating a foreground probability map based on the color model; and means for segmenting the foreground object based at least in part on the foreground probability map and a known foreground object shape.

What is claimed is:

1. An apparatus, comprising:
   a color modeler to build a color model, wherein to build the color model the color modeler is to build the color model based at least in part on a boundary of a foreground object in an image frame;
   an object boundary extractor coupled to the color modeler to identify the boundary of the foreground object, wherein to identify the boundary of the foreground object the object boundary extractor is to identify the boundary of the foreground object based at least in part on a depth frame and a motion mask associated with the image frame, wherein the depth frame has depth information of the image frame and the motion mask has information indicating pixels associated with motion; and
   a segmentation processor, coupled to the color modeler, to segment the foreground object from a background of the image frame, wherein to segment the foreground object from the background of the image frame the segmentation processor is to segment the foreground object from the background of the image frame based at least in part on the color model.

2. The apparatus according to claim 1, wherein to identify the boundary of the foreground object, the object boundary extractor is to produce a plurality of foreground object candidate blobs based at least in part on a connected component analysis performed on a component map based at least in part on the depth frame and the motion mask associated with the image frame.

3. The apparatus according to claim 2, wherein the object boundary extractor comprises an object tracker to provide location information for the foreground object, and the object boundary extractor is to select a working foreground object blob from the plurality of candidate blobs, based at least in part on the location information provided by the object tracker.

4. The apparatus according to claim 1, further comprising:
a motion detector, coupled to the object boundary extractor, to produce the motion mask based at least in part on accumulative frame differencing.

5. The apparatus according to claim 4, further comprises a background buffer to store information indicating a background established for a prior image frame processed, and wherein the motion detector is to refine the motion mask based at least in part on the information indicating the background established for the prior image frame processed.

6. The apparatus according to claim 1, further comprising:
a depth frame generator, coupled to the object boundary extractor, to generate the depth frame for the image frame.

7. The apparatus according to claim 6, wherein the image frame is part of a stereo image frame set including a left frame and a right frame, and the depth frame generator is to rectify the left and right frames to generate a rectified stereo image frame and apply a stereo matching algorithm on the rectified stereo image frame to generate the depth frame.

8. The apparatus according to claim 6, wherein the image frame is an RGB-depth image frame and the depth frame generator is to conduct an RGB-depth aligning process on the RGB-depth image frame to generate the depth frame.

9. The apparatus according to claim 1, wherein the color modeler is to detect a plurality of foreground colors inside the boundary of the foreground object and a plurality of background colors outside the boundary of the foreground object but inside a bounding region based on the boundary of the foreground object, and the color modeler is to refine the color model with a feedback loop based on the plurality of foreground colors and the plurality of background colors.

10. The apparatus according to claim 1, wherein the color modeler is to generate a foreground probability map based on the color model, and the segmentation processor is to segment the foreground object based at least in part on the foreground probability map.

11. The apparatus according to claim 1, wherein the segmentation processor is to segment the foreground object based further on a known foreground object shape.

12. The apparatus according to claims 1, further comprising a stereo camera or an RGB-depth image sensor to generate the image frame.

13. At least one non-transitory machine readable storage medium having a plurality of instructions configured to enable a computer apparatus, in response to execution of the plurality of instructions by the computer apparatus, to:
build a color model based at least in part on a boundary of a foreground object in an image frame;
identify the boundary of the foreground object based at least in part on a depth frame and a motion mask associated with the image frame, wherein the depth frame has depth information of the image frame, and the motion mask has information indicating pixels associated with motion; and
segment the foreground object from a background of the image frame, based at least in part on the color model.

14. The storage medium of claim 13, the instructions configured to further cause the computer apparatus to:
generate a component map based at least in part on the depth frame and the motion mask associated with the image frame;
produce a plurality of foreground object candidate blobs based at least in part on a connected component analysis performed on the component map;
select a working foreground object blob from the plurality of foreground object candidate blobs, based at least in part on location information for the foreground object; and
identify a boundary of the working foreground object blob.

15. The storage medium of claim 13, the instructions configured to further cause the computer apparatus to:
produce the motion mask based at least in part on accumulative frame differencing and a background established for a prior image frame processed.

16. The storage medium of claim 13, wherein the image frame is part of a stereo image frame set including a left frame and a right frame, and the instructions configured to further cause the computer apparatus to:
rectify the left and right frames to generate a rectified stereo image frame; and
apply a stereo matching algorithm on the rectified stereo image frame to generate the depth frame.

17. The storage medium of claim 13, wherein the image frame is an RGB-depth image frame, and the instructions configured to further cause the computer apparatus to:
conduct an RGB-depth aligning process on the RGB-depth image frame to generate the depth frame.

18. The storage medium of claim 13, the instructions configured to further cause the computer apparatus to:
detect a plurality of foreground colors inside the boundary of the foreground object;
detect a plurality of background colors outside the boundary of the foreground object but inside a bounding region based on the boundary of the foreground object; and
refine the color model based on a histogram foreground model and a histogram background model, wherein the histogram foreground model is based on the plurality of foreground colors, and the histogram background model is based on the plurality of background colors.

19. The storage medium of claim 13, the instructions configured to further cause the computer apparatus to:
generate a foreground probability map based on the color model; and
segment the foreground object based at least in part on the foreground probability map and a known foreground object shape.

20. A method, comprising:
building, by a computer system, a color model based at least in part on a boundary of a foreground object in an image frame;
identifying, by the computer system, the boundary of the foreground object based at least in part on a depth frame and a motion mask associated with the image frame, wherein the depth frame has depth information of the image frame and the motion mask has information indicating pixels associated with motion; and
segmenting, by the computer system, the foreground object from a background of the image frame, based at least in part on the color model.

21. The method according to claim 20, further comprising:
detecting a plurality of foreground colors inside the boundary of the foreground object;

detecting a plurality of background colors outside the boundary of the foreground object but inside a bounding region based on the boundary of the foreground object; and refining the color model based on the plurality of foreground colors and the plurality of background colors.

22. The method according to claim 20, further comprising:

generating a foreground probability map based on the color model; and segmenting the foreground object based at least in part on the foreground probability map and a known foreground object shape.

\* \* \* \* \*

UNITED STATES PATENT AND TRADEMARK OFFICE
CERTIFICATE OF CORRECTION

PATENT NO. : 9,536,321 B2
APPLICATION NO. : 14/222342
DATED : January 3, 2017
INVENTOR(S) : Hon Pong Ho et al.

It is certified that error appears in the above-identified patent and that said Letters Patent is hereby corrected as shown below:

In the Claims

Column 15
Line 8, "…further comprises…" should read - …further comprising… -
Line 46, "…claims 1…" should read - …claim 1… -

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*